United States Patent [19]

Miller et al.

[11] 3,929,702

[45] Dec. 30, 1975

[54] PLATABLE POLYPROPYLENE COMPOSITION

[75] Inventors: Robert W. Miller, Mentor; Samuel Garry Howell, Painesville, both of Ohio

[73] Assignee: Diamond Shamrock Corporation, Cleveland, Ohio

[22] Filed: Jan. 22, 1971

[21] Appl. No.: 108,764

Related U.S. Application Data

[63] Continuation-in-part of Ser. No. 13,042, Feb. 20, 1970.

[52] U.S. Cl................... 260/27 R; 260/51; 260/844
[51] Int. Cl.². ........................................ C08L 93/00
[58] Field of Search......................... 260/27, 844, 51

[56] References Cited
UNITED STATES PATENTS

| | | | |
|---|---|---|---|
| 3,043,787 | 7/1962 | Bonvicini et al.................... | 260/4 |
| 3,243,396 | 3/1966 | Hammer............................. | 260/285 |
| 3,280,217 | 10/1966 | Lader et al. ........................ | 260/844 |
| 3,313,754 | 4/1967 | Logan.................................. | 260/27 |
| 3,320,208 | 5/1967 | Mange................................. | 260/51 |
| 3,335,104 | 8/1967 | Kopacki et al...................... | 260/23 |

FOREIGN PATENTS OR APPLICATIONS

| | | |
|---|---|---|
| 68/2282 | 5/1967 | South Africa |
| 68/2279 | 11/1968 | South Africa |

*Primary Examiner*—M. J. Welsh
*Assistant Examiner*—William E. Parker
*Attorney, Agent, or Firm*—John C. Tiernan

[57] ABSTRACT

This invention relates to certain novel polypropylene compositions, and more particularly to polypropylene compositions which, after being formed into predetermined shaped articles, can be more efficiently and effectively plated with a coating of one or more metals. The novel plated articles prepared from polypropylene compositions of the present invention exhibit greatly improved bonding between the metal coating and the polypropylene surface.

The novel polypropylene compositions of the present invention comprise a polypropylene polymer having incorporated therein from about 0.1 to about 10.0 parts (per 100 parts by weight of resin) of a polynydric aromatic compound, and from about 0.25 to about 20.0 parts (per 100 parts of resin) of a rosinous material. The preferred polypropylene compositions of the present invention, in addition to the rosin and polyhydric aromatic compound, contain from about 0.01 to about 5.0 parts by weight (per 100 parts by weight of resin) of a nucleating agent. The novel polypropylene compositions of the present invention may also contain stabilizers, fillers, pigments, processing aids, and other additives well known to those skilled in the art.

3 Claims, 3 Drawing Figures

INVENTOR

BY

ATTORNEY

PLATABLE POLYPROPYLENE COMPOSITION

CROSS REFERENCE TO RELATED APPLICATION

This application is a continuation-in-part of copending U.S. application Ser. No. 13,042, filed Feb. 20, 1970.

BACKGROUND OF THE INVENTION

The present invention relates to polypropylene compositions suitable for metal plating. When shaped articles formed from these polypropylene compositions are plated, the plated articles exhibit greatly improved bonding between the metal coating and the surface of the polypropylene.

Those engaged in the manufacture of metallic articles, particularly decorative, and other non-load bearing metallic articles, have long desired to reduce the frequently inordinate expense of manufacturing such articles. One of the most obvious possibilities for effecting such reductions in costs, would be to substitute a lighter and/or less expensive material for a large portion of the metal in relatively heavy articles. Another obvious possibility would be to simplify the extremely expensive molding, shaping and polishing procedures which must usually be employed in manufacturing such an article from metal. Quite some time ago, it was observed that it might be possible to obtain both of the aforementioned savings by molding or shaping the article from a plastic material, and subsequently plating the surface of the molded plastic article with a coating of metal.

There are of course a number of criteria to be met in order to produce such articles by molding from a plastic and subsequently plating with a metal. To name but a few, the physical property characteristics of the plastic must usually be sufficient to meet all the specifications required of the final article; these physical properties must not be impaired by degradation of the plastic due to contact with the metal; the plastic must be readily platable by vacuum deposition techniques, chemical deposition techniques, electrodeposition techniques, and/or a combination of such techniques, to produce a continuous, uniform metal coating covering 100 percent of the area to be plated; and, the coating of metal must adhere firmly to the surface of the molded plastic article.

Specific applications in which manufacturers have sought to substitute a platable plastic composition for all or part of the former metal content are both numerous and diverse. Recently, for example, a number of possible applications for platable plastic materials for the automotive industry have been suggested, including fabrication of grills and hubcaps. Like most other proposed applications for platable polymers, fabrication of automotive grills and hubcaps would involve the use of significant quantities of materials to produce a very detailed decorative configuration, having a plurality of geometric planes forming essentially a single surface. The use of a platable polymer in such applications is not only advantageous from the point of view of substituting a lighter or less expensive plastic for much of the metal which would otherwise be required, but also because of the efficiency and effectiveness with which extremely detailed and/or structurally shaped configurations can be achieved with plastic molding equipment.

The phenomenal increase in the commercial significance of polypropylene is in many cases attributable to the very low specific gravity of unfilled polypropylene. A substantial reduction in the weight of polymer required for a given application can often be achieved by substituting polypropylene for other popular thermoplastic polymers. Its low specific gravity makes polypropylene a particularly desirable polymer for fabrication of large metal plated plastic articles, such as those described above. Unfortunately, unfilled polypropylene compositions heretofore commercially available have had certain inherent property characteristics which seriously limited their use in manufacturing certain types of articles, including automotive applications such as those noted above. In particular, it is well known that in the absence of large amounts of filler, polypropylene compositions are generally subject to volumetric change with temperature. Shrinkage of the polymer composition during cooling of the mold, particularly in area where there was a change of cross-section in the molded article, resulted in so-called "sink marks", or other surface imperfections and deformities. While it is often possible to eliminate these problems by incorporating from about 20 to about 30 parts of filler (per 100 parts of resin) into the polypropylene composition, this may destroy the specific gravity advantage which may originally have made polypropylene desirable.

The general procedure for manufacturing shaped articles by metal plating an article which has been preformed from a polymeric material, comprises the steps of:

A. forming the polymeric material into the desired shape;

B. cleaning and treating the surface of the formed article to render it more receptive to the metal coating;

C. depositing a metal coating by chemical or vacuum deposition techniques onto the surface of the article; and, if desired, subsequently D. electroplating the coated article to produce the desired deposit of metal coating.

It will of course be understood that each of the steps of the foregoing general procedure can involve a series of specific sub-steps, which are in any given instance a function of the polymer to be employed, the specific metal to be chemically or vacuum deposited onto the surface of the plastic to render it conductive, and the specific metal or metals to be electroplated onto the surface after it has been rendered conductive.

The cleaning or surface treatment steps generally involve washing or immersion in a de-greasing and cleaning solution to remove both surface dirt and any traces of polymer additives which may have migrated to the surface, particularly mold release agents or the like. Following the cleaning step the articles are usually immersed in an acid etching solution, and/or the surface of the shaped plastic article is otherwise treated to improve adhesion of the subsequently deposited metal coating.

In an effort to develop polymeric compositions for plating applications, a number of thermoplastic and thermo-setting polymers have been extensively tested, particularly during the past ten years. For example Belgian Pat. No. 613,430 (Feb. 28, 1962) mentions metal plating of a wide variety of polymers, including polyolefin polymers, vinyl polymers, polyamides, polyurethanes, polystyrenes, polyacrylates, and the like. Various other types of polymers, particularly acrylonitrile-butadiene-styrene (ABS), have also been the subject of extensive experimentation, and even some limited commercial use.

The interest in developing commercial platable plastic compositions, and/or techniques, have also led to the investigation of a wide range of special additives and procedures. For example, U.S. Pat. No. 3,466,232, to Peter S. Francis et al., discloses and claims a method of plating plastic materials in which improved adhesion is obtained by incorporating into the plastic material an additive which will be etched out during the surface preparation step, thereby producing a large number of small pockets having openings in the surface which are smaller in diameter than the largest diameter through their respective pockets.

In effect, the Francis et al. procedure provides a series of undercut pores which will be filled with metal during the plating steps, thereby serving as anchoring points for the metal coating. While the procedure disclosed by Francis et al. does provide a method of improving adhesions, the concentration of additives used in the examples to obtain optimum bonding, was in the order of 33 parts per hundred of resin, a level which can have a serious deleterious effect on the basic physical properties of the polymer.

In the area of special additives, South African patent applications, Ser. No. 68/2279 and Ser. No. 68/2282 were recently published under the title "Electroplatable Polyolefins". Both of these applications claim the priority of U.S. applications filed May 3, 1967, and both relate to polyolefin compositions exhibiting improved adhesion to plated metal coatings.

Application Ser. No. 68/2279 discloses polyolefin compositions containing from 0.25 to 1.5 parts by weight, per hundred parts by weight of resin (hereinafter "phr" for convenience) of a compatible sulfur compound, such as dilauryl thiodipropionate, and from 10 to 60 phr of a sulfate of a metal of Group II of the Period Table of Elements, such as barium sulfate. Suitable polymers, according to the specification, are polyethylene, polypropylene, polybutene-1, poly(4-methylpentene-1), poly(3-methylbutene-1), ethylene propylene copolymers, ethylene butene-1 copolymers, and the like.

Application Ser. No. 68/2282 discloses polyolefin compositions containing from 0.1 to 2.0 phr of a compatible surfactant (highly polar and ionic surfactants being specifically excluded), and in the preferred compositions, from 0.25 to 1.5 phr of a compatible sulfur compound such as dilauryl thiodipropionate. Suitable polyolefin polymers according to this specification include, in addition to those disclosed in application Ser. No. 68/2279, vinyl aromatic polymers and predominantly olefinic copolymers of hydrocarbon monomers with copolymerizable polar monomers such as acrylic monomers and vinyl esters.

The compositions of the above noted South African patent application, as well as the novel procedure of Francis et al., generally provide improved adhesions in metal plated plastic articles. In fact, for some time now certain limited commercial success has been reported in producing metal plated articles from ABS compositions, and more recently from polypropylene. In spite of this limited commercial success however, and even with the recent improvements described above, a generally satisfactory commerical polymer composition and complimentary procedure, have not heretofore been found.

Other types of investigations have also been made in the area of platable plastic compositions, investigating the effect on adhesion of such things as, the types and amounts of filler, variations in molding equipment used in forming the plastic, and/or variations in the operating conditions of a given piece of equipment, e.g., faster cooling, slower cooling, higher or lower temperatues, and the like. Of particular interest is the recent work of Fitchmun et al., "Surface Morphology in Semi-Crystalline Polymers", Polymer Letters, Vol. 7, pp. 301–305 (1969). The authors indicate that the surface against which the polymer is molded, e.g., aluminum, copper, Mylar, Teflon, etc., apparently has an effect on the surface characteristics of the molded part, which in turn appears to affect the adhesion of the metal coating which is subsequently plated onto the surface. Fitchman et al. theorize that the surface crystallinity is altered, and that the surface crystallinity may therefore affect adhesion.

The theory of Fitchmun et al., that the changes in adhesion were directly related to an alteration of surface crystallinity, will undoubtedly be the subject of further work by both the original investigators and others. At this time, based on the results we have observed in our testing, we are not in a position to form an opinion one way or the other, with respect to the surface crystallinity theory. Nevertheless, the work of Fitchmun et al. would seem to have clearly established that adhesion is, to at least some extent, a function of the surface of the molded plastic article. As will be seen in more detail hereinafter, our tests confirm the observations of Fitchmun, that there is a direct relationship between the surface of the molded article, and the adhesion to that surface of a subsequently plated metal coating.

The evaluation of the adhesion between the metal coating and a molded plastic substrate, is generally based on the pounds of mechanical force required to peel the metal coating from the substrate, in a 90° peel test with a tensometer. In general, the testing procedure is referred to as the "Jacquet Test", see for example, P. A. Jacquet, Transactions of the Electrochemical Society, Vol. 66, p. 393 (1934). A number of modifications or variations of the Jacquet Test have also been used, and several have been published, including Saubestre et al., "The Adhesion of Electrodeposits to Plastics", presented at the American Electroplaters Society 52nd Annual Convention, July 13, 1965; and also "Testing of Plating on Plastics", Product Finishing, Vol. 18, No. 5, May, 1965. Nevertheless, the essential nature of the test remains the same, the plated sample is prepared, and a cut is made through the metal to form one or more strips of a given width, a portion of the test strip is peeled part way back, the plated test sample piece is clamped horizontally in the fixed jaw of the tensometer, and the peeled portion of the metal strip is clamped vertically in the pulling jaw of the tensometer. The pulling jaw is then retracted at a constant rate of separation and the tensile load, acting at approximately 90°, is measured.

BRIEF DESCRIPTION OF THE DRAWINGS

The attached drawings are 675X photomicrographs of a cross-section of a test sample molded from one of the preferred compositions of the present invention (FIG. 2); a similar polypropylene composition from which the additive system of the present invention had been omitted (FIG. 1); and a commercially available platable polypropylene composition (FIG. 3).

SUMMARY OF THE INVENTION

The novel polypropylene compositions of the present invention comprise a polypropylene resin having incorporated therein from about 0.1 to about 10.0 phr of a polyhydroxy aromatic compound, and from about 0.25 to about 20.0 phr of a rosinous material. The preferred compositions of the present invention also contain from about 0.01 to about 5.0 phr of a nucleating agent. In addition to the additives just described, hereinafter for convenience referred to as "the additive system of the present invention", the compositions of the present invention may also contain stabilizers, antioxidants, fillers, pigments, processing aids and other additives well known to those skilled in the art.

In the preparing, processing, testing, and evaluating of articles formed from the novel polypropylene compositions of the present invention, we have found a number of totally unanticipated advantages and/or properties, with respect to the polypropylene composition itself, the unplated articles formed from the novel polypropylene composition, and also the final metal plated articles. Some of the more important of these unexpected advantages and/or properties include:

1. the compositions of the present invention can be molded, extruded, or otherwise formed like any conventional polypropylene composition; however, after forming they appear to have certain unique surface characteristics which in some unexplained manner apparently facilitate more efficient and effective metal plating of the formed article;

2. in plating articles formed from the novel polypropylene composition of the present invention it is possible to obtain a much greater degree of adhesion between the metal coating and the plastic surface than was heretofore possible;

3. even more surprising, is the fact that the improved adhesions can be obtained with modified procedures in which several preliminary steps in the plating procedure, heretofore considered absolutely essential in plating articles formed from polypropylene, can be omitted;

4. a more uniform metal coating over 100 percent of the surface to be plated can be more easily and consistently obtained employing a wide variety of chemical deposition procedures;

5. the additive system of the present invention is apparently effective only in the preparation of platable polypropylene compositions, and provides little, if any, improvement in the preparation of platable plastic compositions from other polymers, even other poly-α-olefins;

6. the novel polypropylene compositions of the present invention are for some unexplained reason less subject to volumetric change with temperature, and therefore so-called sink marks, and other surface imperfections and deformities heretofore associated with thermal contraction of unfilled polypropylene (at a change of cross-section in a molded article) can in most cases be so substantially reduced, as to be for all practical purposes eliminated;

7. since the novel polypropylene compositions of the present invention do not require large amounts of filler to improve adhesion and/or molding characteristics, the chemical and physical properties of the plastic composition are considerably less likely to be disadvantageously modified. Also, the lower specific gravity of the unfilled material will of course substantially reduce the weight of material required to produce a given article, and in almost every case, thereby effect a corresponding reduction in cost.

The foregoing is by no means a comprehensive list of the advantages of improvements which are associated with the compositions of our invention, but merely illustrative of what we consider the most obviously unexpected, and/or important, and/or significant, at this time. We have observed a wide variety of other advantages and improvements in conjunction with the compositions of our invention, some of which will be specifically noted in conjunction with the detailed examples and tests described below, and others which will be devious from the detailed description which follows hereinafter.

The rosinous additive of the present invention should be understood to include, but is not limited to, one or more members selected from the group consisting of natural rosins, synthetic resins, and rosin derivatives. As examples of rosinous materials within the scope of the present invention, mention may be made of wood rosin, wood rosin esters, modified wood rosin, polymeric rosinous materials, hydrogenated wood rosins, and synthetic materials such as ester resins, polyterpenes, and the like.

A number of polyhydroxy aromatic compounds have been found to be useful as additives in the preparation of the compositions of the present invention. Certain bisphenol and dihydroxybenzene type compounds, particularly thiobisphenols, sulfonylbisphenols, resorcinol and gamma-resorcylic acids have been found to be particularly useful.

Particular stabilizers, pigments, and other additives were present in most of the test compositions described hereinafter, in order to assure a valid basis for comparison in the evaluation of the present invention. However, a wide variety of substitutes for such stabilizers, pigments, and other additives were also tested, and were found to have little, if any, discernible effect on the improvement in the degree of adhesion obtained. Thus, while insignificantly different adhesions might be obtained with one type of stabilizer or pigment, etc., in comparisons with other polyolefin compositions containing different stabilizers, pigments, etc., compositions containing the special additive system of the present invention consistently showed the same marked improvement in adhesion.

As noted earlier, the polypropylene compositions of the present invention may be formed into the desired shape or configuration by any of the number of means well known to those skilled in the art, such as various types of conventional molding procedures, extrusion procedures, or the like, including forming into cast or oriented film, direct extrusion or other types of fiber forming, and the like.

After forming, the metal plating can likewise be accomplished by any number of procedures well known to those skilled in the art. For example, there are a wide variety of specific procedures for vacuum deposition of a thin surface coating of metal over a plastic, and an even wider variety of specific procedures for chemical deposition of such a coating. Also, following the vacuum as chemical deposition steps, the desired thickness of the metal coating and/or the coating of additional metals can be obtained by a number of well known electroplating, or other techniques.

We cannot at this time definitely define the mechanism by which the polyolefin compositions of the present invention provide better adhesion to the plated metallic coating, however these improved adhesion properties are observed under all of the various conditions under which we have conducted our tests. While we will in no way limit ourselves to any one theory by which the improved adhesion observed in testing our compositions might be explained, it would appear that the additive system of our invention causes an alteration of the physical and/or chemical state of the surface of the molded plastic, and this in turn may cause the subsequent improvement in adhesion.

Thus, as compared with unmodified polyolefin compositions, and also as compared with commercially available competitive "platable grade polypropylene resins", the compositions of the present invention consistently exhibited superior adhesion under all types of forming, processing, and/or plating procedures. As will be seen in more detail hereafter, these differences in adhesion would appear to be improvements in kind, rather than degree of adhesion.

As noted, the interest in developing a commercial platable plastic system has involved not only the investigation of polymer compositions and additives, but also plating techniques and procedures. A number of so-called "commercial plastic plating processes" have been developed, and some of these are well known in the art. These would include, for example, the so-called Enthone System, and/or the so-called MacDermid System. Typically, however, wide variations in plating bath additives and the concentrations of such additives, as well as other significant differences exist within any single given system. For example, most of these so-called commercial plating systems, were originally developed for plating ABS compositions, and the number of modifications, such as changes in the concentrations in the components of the acid etching baths, etc., must be made where these systems are employed in the plating of polypropylene.

By way of illustration, and not by way of limitation, as examples of plating procedures employed in preparing test samples for evaluation of the compositions of the present invention, mention may be made of the following known general procedures:

THE ENTHONE PROCESS

1. The test sample, formed from polypropylene, or some other polymer, by molding in a conventional press or the like, is immersed in a conditioner consisting of 40% sulfuric acid (96% concentration), 39.5% phosphoric acid (85% concentration), 3% chromium trioxide, and 17.5% water, to which has been added (per liter of conditioner) 36 g. of an additive containing 64% of chromium trioxide and 36% sodium hydrogen sulfate, for a period of 10 minutes at 85°C.;

2. Then in a stannous chloride sensitizer solution containing (per liter of solution) 10 g. of $SnCl_2$ and 40 ml. of HCl, at room temperature, for 1 to 3 minutes;

3. Then in an activator solution containing (per gallon of solution) 1 g. of palladium chloride and 10 ml. of HCl, for a period of 1 to 2 minutes at room temperature;

4. Then in an electroless copper plating solution containing per liter of solution, 29 g. of copper sulfate, 140 g. of Rochelle Salt, 40 g. of sodium hydroxide and 166 g. of formaldehyde (37% solution) at a temperature of 70°C. for a period sufficient to obtain a continuous coating capable of conducting electricity;

5. Then electroplating, to produce the desired deposit of metal, in tests, usually a deposit of 2 mil of copper.

THE MACDERMID PROCESS

1. The molded sample was immersed in a water emulsion containing 8% by volume terpentine plus a polyoxyethylenephenylether wetting agent, for from 5 to 10 minutes at 150°–160°F.;

2. Then immersed in a chromic acid cleaning solution containing 350 g. per liter of chromic acid for 1 to 2 minutes at 135°F.;

3. Then immersed in an acid etch solution composed of 190 g. of chromic acid in 500 g. of sulfuric acid, for 5 to 6 minutes at 175°–180°F.;

4. Then immersed in a solution containing 1 to 2% of an alkylarylsulfonate wetting agent in water, for 1 to 3 minutes at 75°–85°F.;

5. Then immersed in an activator bath composed of a colloidal solution of 150 g. of stannous chloride and 2 g. of palladium chloride, in 20% hydrochloric acid, for 3 to 5 minutes at 85°–90°F.;

6. Then immersed in a catalyst bath composed of hydrochloric acid containing 0.2 g. per liter of palladium chloride, for 1 to 3 minutes at 115°–125°F.;

7. Then immersed in an electroless nickel bath for 5 to 8 minutes at 85°–90°F. The electroless nickel bath contained (per liter) 10 g. of nickel ions, 30 g. of sodium hypophosphite, 30 g. of citric acid, and sufficient ammonium hydroxide to adjust the solution to a pH of 8 to 9;

8. The samples were then placed in a conventional electroplating bath, to produce the desired deposit of metal, again in the case of test samples, usually a deposit of about 2 mil of copper.

It will of course be obvious that the steps of the two plating procedures described above are the substantive or functional steps, and in most cases there was at least one water rinse step between each of the substantive or functional steps described. Several other plating procedures, in addition to the two procedures described in detail above, were also employed in plating sample compositions according to the present invention. In every case, the compositions of the present invention exhibited substantially the same degree of superior adhesion, in comparisons with other polypropylene and/or other plastic compositions, simultaneously plated according to the same procedure.

In order to achieve a greater degree of uniformity, it is of course desirable to use a single plating procedure to prepare all samples, other than those to be used in tests conducted to evaluate the effect, if any, of alternative plating procedures. Therefore, unless otherwise specifically noted, the test samples of the present invention were plated, using the so-called MacDermid System, described above.

Variations in testing results with a single given composition were frequently observed, due to day-to-day changes in the various cleaning and treatment solutions, and more probably because of day-to-day variations in the plating baths. These day-to-day variations are particularly common where the procedures are carried out in solutions and plating baths of the size employed in laboratory experimentation. For this reason, the only valid comparisons which can be made, are on samples which were processed simultaneously in each of the various steps from compounding through testing.

An even more important source of variations in the results observed in testing samples prepared at different times, is the metal coating itself. Since the adhesion is measured by the peel strength in a 90° tensometer test, the consistency of test results are a function of the consistency of the ductility of the metal coating. In preparing samples to test adhesion, it is therefore generally accepted procedure to deposit copper in the electroplating step, in order to achieve a more ductile metal coating. If the thickness of metal coating on one sample is greater than that on a sample prepared in an earlier or later experiment, the thicker metal coating will of course be less ductile, and a comparison of peel test strengths as to such samples would be clearly meaningless.

In evaluating the results of the various detailed experiments and tests set forth hereinafter, it should therefore be noted that all of the data contained within a particular table or comparison were obtained from samples which were, insofar as possible, prepared at the same time, processed at the same time, and tested at the same time.

Except as used in the specific examples hereinafter, and unless otherwise clearly indicated by the context, as used herein, the term "polypropylene" shall be understood to include propylene homopolymers, and copolymers of propylene with up to 25 percent by weight of a comonomer selected from the group consisting of $\alpha$-olefins, other than propylene, having from 2 to 5 carbon atoms, and vinyl monomers. Again unless the contrary shall be clearly obvious from the context, as used herein the terms "shaped articles", "predetermined shaped articles", "forming into predetermined shapes", "molding", "forming", and the like, should be understood in the broad sense, as including any method of forming polypropylene compositions into film, fiber, or molded articles, and should not be construed in the limiting sense, or as restricting the present invention to articles of a predetermined shape formed only by so-called conventional molding techniques. The use of conventionally molded polypropylene articles in most of the testing is also primarily a matter of convenience, though they are also somewhat more meaningful since the most immediate and probably the majority of applications for metal plating, involve conventionally molded articles.

DESCRIPTION OF THE PREFERRED EMBODIMENTS

The preferred polypropylene composition of the present invention comprises a polypropylene resin having incorporated therein from about 0.5 to about 5.0 phr of the rosin containing material, from about 0.01 to about 3.0 phr of a nucleating agent; and from about 0.2 to about 3.0 phr of a dihydroxy aromatic compound (hereinafter for convenience, referred to as "phenolic additive"). The preferred dihydroxy aromatic compounds are resorcinol compounds, and compounds within the scope of the formula:

wherein R is a member selected from the group consisting of alkylene radicals, sulfur atoms, sulfonyl radicals, and other sulfur containing radicals; wherein R', R'', R''', and R$^{IV}$ may be the same or different, and each is a member selected from the group consisting of hydrogen atoms and alkyl radicals having less than 15 carbon atoms; and wherein n and m are integers which may be the same or different, and each may be 1, 2, or 3.

As examples of dihydroxy aromatic compounds within the scope of the foregoing general formula, mention may be made of the following specific compounds which are offered by way of illustration and not by way of limitation:

(1)

4,4'-thiobis(6-<u>tert</u>-butyl-<u>m</u>-cresol)

(2)

2,2'-thiobis(<u>p</u>-<u>tert</u>-butylphenol)

(3)

2,2'-sulfonylbis(<u>p</u>-<u>tert</u>-butylphenol)

(4)

4,4'-methylenebis(6-<u>tert</u>-butyl-<u>o</u>-cresol)

As examples of dihydroxybenzene type compounds, mention may be made of resorcinol and substituted resorcinols, particularly gamma-resorcylic acids such as 3,5-di-tertbutyl-gamma-resorcylic acid, 3,5-di-tert-benzyl-gamma-resorcylic acid, and other alkyl, aryl, and aralkyl substituted gamma-resorcylic acids.

The following detailed examples are offered by way of illustration, and not by way of limitation, to describe in greater detail the preparation, treatment, and testing of the novel compositions of the present invention. They also illustrate the highly unexpected increase in adhesion which is observed between articles, formed from these compositions, and a metal coating which is subsequently plated thereto.

EXAMPLE 1

A series of compositions were prepared, having the formulations described in Table I.

Table 1

| Materials | Compositions (in parts by Weight) | | | | |
|---|---|---|---|---|---|
| | A | B | C | D | E |
| Polypropylene Resin | 100.0 | 100.0 | 100.0 | 100.0 | 100.0 |
| Butylatedhydroxy-toluene (BHT) | 0.2 | 0.2 | 0.2 | 0.2 | 0.2 |
| Calcium Stearate | 0.15 | 0.15 | 0.15 | 0.15 | 0.15 |
| Foral AX-Wood Rosin* | — | 2.0 | — | 2.0 | 2.0 |
| Santonox R** | — | — | 0.5 | 0.5 | 0.5 |
| Aerosol OTB Surface Active Agent*** | — | — | — | — | 0.5 |
| Adhesion: Peel Strength (in lbs./inch) | 7 | 14 | 15 | 26 | 31 |

*A thermoplastic acidic resin produced by hydrogenating wood rosin; acid No. 160, refractive index (at 100°C.) 1.4960; Abietic acid (U.V.)., %-0.15.
**4,4'-thiobis(6-tertiary-butyl-m-cresol)
***85% dioctyl ester of sodium sulfosuccinic acid and 15% sodium benzoate A number of test plaques were prepared by injection molding from each composition. Each test plaque measured 1.0 by 4.0 by 0.125 inches, and all were molded on the same day, using the same mold and equipment. Except for suitable marking, and trimming of runners, the test plaques were used as taken from the mold. The chemical deposition of a metal coating on the test plaque was accomplished by the "Modified MacDermid Process", described hereinbefore. In this procedure, only steps 3–8 of the overall MacDermid Process were employed, the first two steps being completely eliminated. All samples were plated in the same bath, at the same time. After the chemical deposition step, the samples were rinsed and placed in a conventional copper electroplating bath and a coating of 0.002 inch (average thickness) was deposited on the plaque. Following electro-deposition of the copper, the samples were removed, rinsed, and dried. After drying, the samples were oven aged for ½ hour at 150°F. Adhesion of the metal coating to the plastic was then measured by means of a 90° pull test of the Jacquet type, described hereinbefore, each of the samples being separately tested for adhesion. The result of the tests on all of the plaques prepared from a given composition were used to compute the average adhesion for that composition, which is included in Table 1.

A long series of experiments were subsequently conducted to test the criticality of the specific materials, concentrations and conditions, etc. of Example 1. In these tests, variations were made in the concentration of the additives in Table 1, and/or other materials were substituted for those used in Table 1, and/or other changes were made in the various conditions, procedures, and the like.

EXAMPLE 2

The procedures of Example 1 were repeated in duplicate, except for the chemical deposition procedure. In one case the complete MacDermid System, and in a second case the Enthone System was used in place of the Modified MacDermid Process of Example 1. When the complete MacDermid Plating Procedure was employed, there was no significant change in adhesion. Where the Enthone Process was used, the adhesion figures were much lower than those reported in Example 1, but the same relative degree of improved adhesion of composition D and E (over compositions A, B, and C) was clearly evidenced.

EXAMPLE 3

Various other polyolefin homopolymers were substituted for the polypropylene resin of Example 1, including poly-4-methylpentene-1, polybutene-1, high density polyethylene, and low density polyethylene. There was no evidence of any substantial difference in the adhesion results exhibited by compositions A, B, C, D, or E in these experiments. In other words, the additive system of the present invention did not improve adhesion characteristics of these polymers, and the adhesion results with compositions D and E were little if any better than those of compositions A, B, or C. Block and random copolymers of propylene with up to about 20 percent or more ethylene did show substantial improvements in adhesion when the additive system of the present invention was employed.

EXAMPLE 4

In order to evaluate the effect of the concentration of the rosinous additive on adhesion, a series of compositions similar to those in Example 1 were prepared in which the concentration of the wood rosin in composition 1(B) was first doubled to 4.0 parts, and then further increased to a concentration of 10.0 parts, without substantially affecting the adhesion pull test results. In fact the pull test results for these two samples were 1 lb. and 2 lbs., respectively, lower than the adhesion results observed on the original sample B, and a duplicate of that material run during this experiment. In subsequent testing it was found that, under the conditions of these experiments, a concentration of approximately 0.5 to 5.0 parts of rosinous additive is the preferred range of concentration, and that about 2.0 parts is about the optimum concentration.

EXAMPLE 5

A series of tests similar to those of Example 4 were run, varying the concentration of the phenolic additive. In these tests, the composition of Example 1C was reproduced using 1.0, 3.0, and 5.0 parts of Santonox R, in place of the 0.5 part used in Example 1. Adhesion testing of these samples showed that while the increased concentration of phenolic additive generally tended to improve adhesion very slightly, between 1 and 3 pounds better than the figures for composition 1C, the adhesion results were substantially the same as those set forth in Example 1C, and in no way comparable to the improved adhesion of composition 1D or 1E. A wide range of other concentrations of phenolic additive were also examined and tested, and found to have no substantial effect on results. It is felt that a phenolic additive concentration in the range of from about 0.2 to about 3.0 parts is to be preferred, and a concentration of about 0.5 part appears to be about optimum, at least under the conditions of these experiments.

EXAMPLE 6

A further series of compositions, similar to those described in Example 1, were prepared, in which other phenolic additives were substituted for the Santonox R, e.g., the 4,4'-thiobis(6-tertiary-butyl-m-cresol), of Example 1. As examples of the various types of compounds tested for utility as the phenolic additive of the present invention, mention may be made of the following, to name but a few:

| PHENOLIC ADDITIVE TESTED | ADHESION IN COMPARISON TO SANTONOX R |
|---|---|
| 4,4'-thiobis(6-tertiary-butyl-o-cresol) | About 2 lbs. less |
| 2,2'-thiobis(p-tertiary-butyl phenol) | About the same |
| 3,5-ditertiary-butyl-y-resorcylic acid | About 2 lbs. more |
| 2,2'-sulfonylbis(p-tertiary-butyl phenol) | About 10 lbs. more |
| Resorcinol | About 2 lbs. more |
| 4,4'-methylene bis(6-tertiary-butyl-o-cresol) | About 4 lbs. less |
| Bisphenol A | About 8 lbs. less |

Since 2,6-ditertiary-butyl-p-cresol is present as a stabilizer in the polypropylene composition of Example 1, its importance to the compositions of the present invention was carefully studied. In these tests the effect of BHT was tested both by substitution of a completely different stabilization system, and also by incorporating increased levels of BHT, to determine its suitablility as a phenolic additive, in conjunction with the compositions of the present invention. In these tests it was found that neither the presence, nor the concentration, of BHT had any substantial effect on the subsequent adhesion tests, and there was no evidence of synergistic or other interaction with the rosinous additive.

EXAMPLE 7

A still further series of tests was conducted in which several different types of stabilizer systems were substituted for the BHT-calcium stearate system employed in the compositions of Example 1. None of these tests showed any substantial variation from the results observed in Example 1, and adhesion test results were within 1-2 lbs. of those observed with a control sample having the same formulation as the corresponding composition of Example 1.

EXAMPLE 8

A series of tests similar to those of Example 6 was then conducted in which substitutes for the rosinous additive, rather than the phenolic additive, were evaluated. As examples of rosinous additives tested for utility, mention may be made of the following:

| WOOD ROSIN ADDITIVE TESTED | ADHESION IN COMPARISON WITH FORAL AX |
|---|---|
| FORAL AX - Hydrogenated Wood Rosin | Standard |
| FORAL A - Hydrogenated Wood Rosin | About 4 lbs. less |
| FORAL 85 - Hydrogenated Wood Rosin Ester | About the same |
| FORAL 105 - Hydrogenated Wood Rosin Ester | About 2 lbs. less |
| WING TACK 95 - Synthetic Polyterpene Resin | About 2 lbs. less |
| NUROZ - Polymerized Wood Rosin | About 1 lb. higher |
| NILOX U - Disproportionated Wood Rosin | About 2 lbs. less |
| NIREZ 1100 - Polyterpene Resin | About 4 lbs. less |
| UNITOL NCY - Tall. Oil Rosin | About 2 lbs. less |
| UNITOL ROS - Tall. Oil Rosin | About 1 lb. higher |
| ACTINOL R3A - Tall. Oil Rosin | About 9 lbs. higher |
| UNIREZ 3013 - Tall. Oil Rosin Ester | About 2 lbs. less |
| UNIREZ 701 - Tall. Oil Rosin Ester | About 4 lbs. less |

EXAMPLE 9

A further series of experiments was conducted to determine the effect of various types of fillers on the compositions of the present invention, at concentrations from 3 to as high as 50 parts (per 100 parts of resin). As examples of fillers examined during these tests, mention may be made of silicas, particularly very fine particle size silicas, clays, glass fibers, barium sulfate, zinc oxide, talc, carbon black, titania, and also other well known fillers, and a wide variety of pigments.

A study of the test results of this series of experiments indicates that in conjunction with the additive system of the present invention, the incorporation of fillers generally tends to effect a slight lowering of adhesions. In general this was true of all fillers although titania and carbon black would give slight increases in adhesion at some concentrations. This is contrary to the general, accepted theory that the incorporation of fillers will result in a significant increase in adhesion. More importantly, it clearly demonstrates that the rosinous additive of the present invention is not functioning as a filler, and that insofar as it results in an increase in adhesion, the mechanism by which that increase in adhesion is obtained bears no relationship to the accepted practice of adding fillers to increase plating adhesion.

EXAMPLE 10

In an early series of tests other surface active agents were substituted for the Aerosol OTB, in Composition 1E, including Pluronic L-64, a nonionic surface active agent, and Aerosol OT (the dioctyl ester of sodium sulfosuccinic acid) which does not contain the trace amount of sodium benzoate present in Aerosol OTB. In these early tests the substitute material seemed to give results equivalent to those observed with composition 1E.

EXAMPLE 11

Because the Aerosol OTB contains 15% sodium benzoate, which is a known nucleating agent for polypropylene, a further series of samples were subsequently prepared to test the effect, in any, of sodium benzoate or other nucleating agents. The addition of 0.5, 1.0, and 2.0 phr of sodium benzoate to composition A of Table 1 was found to have no discernable effect on adhesion. In further tests sodium benzoate was substituted for the 0.5 phr of Aerosol OTB in formulation E of Table 1, and the adhesion results indicated that the sodium benzoate gave at least equal and in most cases improved adhesion. A test in which 0.02 phr of sodium benzoate was substituted for the 0.5 phr of Aerosol OTB in composition 1E, indicated that the sodium benzoate containing sample had better adhesion. In most cases the adhesion of the sodium benzoate containing samples were about 4 to 5 pounds better. Still further tests with other known nucleating agents such as fine particle size polyvinylidene fluoride powder gave similar results and equal adhesion.

EXAMPLE 12

The series of tests conducted in Example 10 were re-run in view of the results in Example 11. The two surface active agents tested in Example 10 and several additional wetting agents were examined in this series of adhesion tests. The results indicate that while these compositions consistently exhibited better adhesion than previously known compositions, they were generally somewhat lower than those for composition D or E of Table 1. These results obviously did not correspond to those of Example 10. The tests were therefore re-repeated several additional times and on each occasion the results observed in Example 12 were produced. While we are at a loss to explain the results which we observed in originally conducting Example 10, it would now appear quite clear that it is indeed the small amount of nucleating agent in the Aerosol OTB rather than the surfactants which produce the preferred compositions of our invention.

EXAMPLE 13

A further series of samples was prepared varying the concentrations of the phenolic additive, and/or the rosinous additive. Greatly improved adhesion was observed where the concentration of the phenolic additive was in excess of about 0.1 phr and the concentration of the rosinous additive was in excess of 0.25 phr, with optimum adhesion generally observed in compositions containing at least 0.2 phr of phenolic additive and 0.5 phr of the rosinous additive. Considerably lower concentrations of each of these additives will still yield greatly improved adhesion if the concentration of the other additive is greater than the level specified above, and even where each additive is used at a level less than that suggested above, the results are superior to those obtained with previously known compositions. A concentration of phenolic additive in excess of about 10.0 phr, and/or a concentration of rosinous additive in excess of about 20.0 phr, and/or a concentration of nucleating agent in excess of about 5.0 phr, seemed to have a slightly deleterious effect on the general physical properties of the polymer composition, and generally tended to reduce adhesion in comparison with samples containing a lower concentration of additive; though still better than previously known platable polypropylene compositions, by at least an order of magnitude.

EXAMPLE 14

A series of tests was conducted to compare the compositions of the present invention with two competitive polypropylene resins designated by their manufacturers as "platable grade polypropylene". Test plaques were prepared from the two commercial platable polypropylene resins, and also from a composition within the scope of the present invention (Composition E of Table 1). Test plaques of each composition were plated using the MacDermid system in one series of comparisons, and the modified MacDermid process in a second series of comparisons. Adhesion testing of the plated test plaques resulted in adhesions of about 10 and 15 pounds for the samples prepared from the two commercially available "platable polypropylene resins", as compared with about 31 pounds for the test plaques prepared using composition E of Table 1.

EXAMPLE 15

A still further series of tests was conducted in which distearylthiodipropionate and dilauroylthiodipropionate, respectively, were substituted for in one instance the butylated hydroxytoluene in composition D of Table 1, and in a second case for the phenolic additive (SANTONOX R) in composition D of Table 1. It was found that the substitution of either of these materials for the butylated hydroxytoluene had no substantial effect on the adhesion of test plaques subsequently molded from the compositions. On the other hand, in tests where the dilauroylthiodipropionate or the distearylthiodipropionate were substituted for the phenolic additive (SANTONOX R) it was found that the greatly increased adhesions reported in Table 1 were no longer obtained.

While we are unwilling at this time to limit ourselves to any one theory by which the greatly improved adhesions obtained by using the compositions of the present invention, can be explained, there would seem to be very strong evidence that the additive system of the present invention is some way affects the surface characteristics of the molded polypropylene, and that this in turn may have some significant effect on the adhesion of a metal coating subsequently deposited on the surface. The effect of the additive system of the present invention on the surface of the molded polypropylene is clearly evidenced in the attached drawings, in which FIG. 1 is a cross-sectional photomicrograph of an unplated, untreated molded test plaque formed from composition A of Table 1, FIG. 2 is a photomicrograph of a similar plaque formed from composition E of Table 1, and FIG. 3 is a photomicrograph of a sample plaque formed from a competitive "platable polypropylene resin".

Figure 1:
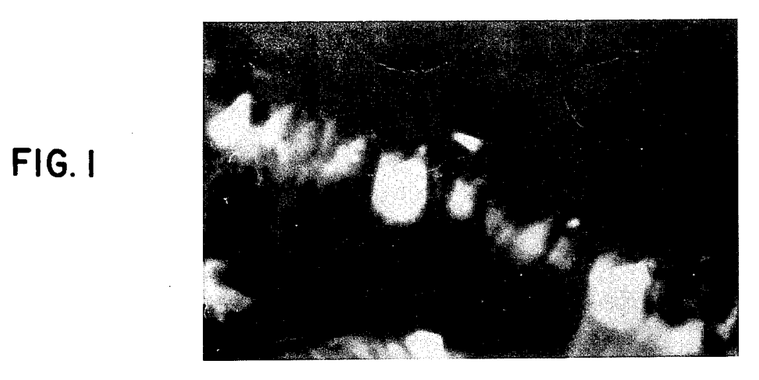
Figure 2:
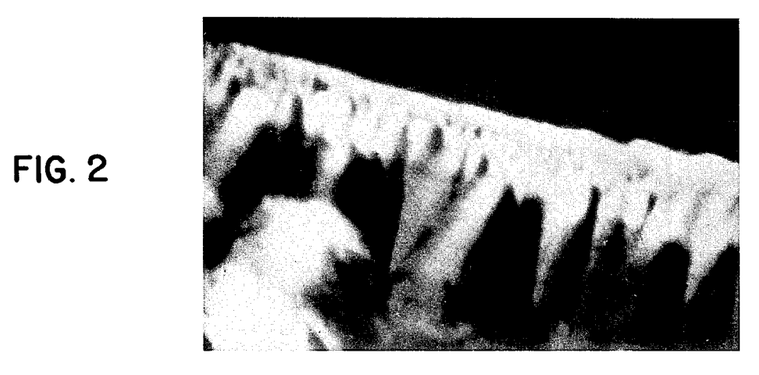

Examining FIG. 2, it is clear that there are a plurality of needle-like crystals projecting from the surface of the sample, contrasting quite sharply with FIG. 1, in which seemingly similar needle-like crystalline projections have a layer of smooth unporous material filling the interstices around and over the needle-like crystalline projections. Again, while we do not limit ourselves to this single theory by which the improved adhesions observed in conjunction with our invention can be explained, it would seem quite reasonable that the surface depicted in FIG. 2 would quite naturally enhance adhesion.

A surface such as that depicted in FIG. 2 should give considerably better adhesion to a painted or plated coating, because of the enormous number of depressions and/or interstices, and/or projections, presented by that surface. In other words, it is well known that adhesion of almost any type of coating can be improved by "roughening" the surface of the substrate to which it will be applied, and the surface depicted by FIG. 2 is in essence the "classic substrate" for painting or coating. In addition, where adhesion is dependent upon, or improved by, chemical treatment of the surface, such as by etching or chemical activating, it is clear that such treatment can be carried out more effectively and/or efficiently on a surface such as that depicted in FIG. 2.

Figure 3:
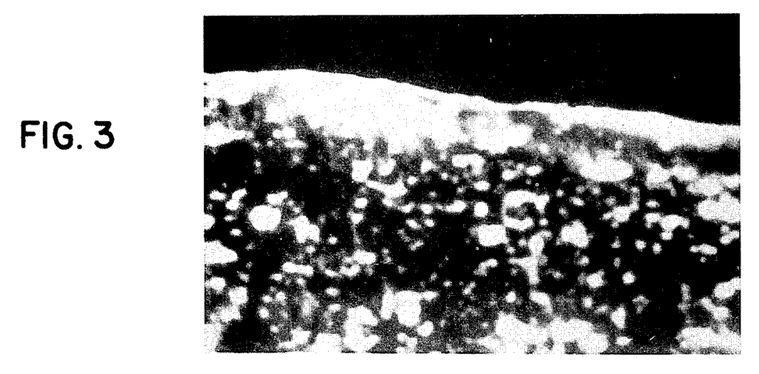

The photomicrograph of FIG. 3 shows the molded surface of a sample prepared from a competitive "platable grade polypropylene". FIG. 3 depicts a very smooth surface, and the bright spots indicate a highly filled polymer composition. It is quite likely that during the pre-plating processing techniques some of the filler particles may be in some way etched out, leaving small pores which can serve as anchoring points for a subsequent metal coating, perhaps in a manner similar to that described in U.S. Pat. No. 3,466,232 to Francis et al. If this is indeed the means by which adhesion of a plated metal coating is effected to the surface such of such a composition, it will be clear that even the most severe etching of randomly dispersed particles, such as those depicted in FIG. 3, cannot yield a surface which would compare with the almost classic coatable substrate depicted by FIG. 2.

There are of course well known special techniques to effect additional improvements in adhesions with platable plastics. For example, it was noted in Example 1 that the plated test samples were oven aged for ½ hour at 150°F., and in some of the other experiments, other aging procedures were employed, for example 2 days at room temperature. It is well known that aging both before and after plating can improve adhesion pull test results, and in our experiments we observed that aging also improved the adhesions in our tests, but the relative superiority of the compositions within the present invention, over the compositions heretofore known, still remained substantially the same, whether the samples were aged or not.

On the other hand, while it has been noted that the addition of fillers is generally considered to be a well known technique for improving adhesion, we found, in the experiments described in Example 9, that the use of fillers in conjunction with the compositions of the present invention generally tended to effect a slight lowering of adhesions. But again, though our adhesion figures were slightly lower when filler was added, they were still several orders of magnitude better than filled polypropylene compositions without the novel additive system of the present invention.

Besides the use of additional materials, or additional procedures, substitute materials and/or substitute procedures can also be employed. Thus the chemical deposition step which is traditionally employed in commercial processing of platable plastics, might be omitted, and replaced for example by a coating of metal deposited by vacuum deposition techniques, or possibly by an electrically conductive paint, since the surface of polypropylene articles molded from compositions of the present invention exhibit the almost classic substrate surface noted earlier.

It will therefore be obvious that a wide variety of changes and substitutions can be made in the materials, compositions, and procedures described hereinbefore, without departing from the scope of the invention herein disclosed.

We claim:

1. A novel composition of matter comprising a polymer selected from the group consisting of polypropylene homopolymers and copolymers of propylene and other alpha-olefins wherein at least 80 percent of the monomer units are propylene; said polymer having incorporated therein:

A. from about 0.1 to about 10.0 parts by weight per 100 parts by weight of polymer of a polyhydroxy aromatic compound selected from the group consisting of resorcinol, alkyl substituted gamma-resorcylic acids, aryl substituted gamma-resorcylic acids, aralkyl substituted gamma-resorcylic acids, and compounds within the scope of the formula:

wherein R is a member selected from the group consisting of sulfur atoms, sulfur containing radicals, and methylene radicals; wherein R', R'', R''', and R$^{IV}$ may be the same or different, and each is a member selected from the group consisting of alkyl radicals having less than 15 carbon atoms; and wherein $n$ and $m$ are integers which may be the same or different, and each may be 0, 1, 2, or 3;

B. from about 0.25 to about 20.0 parts by weight per 100 parts by weight of polymer of a rosinous material, said rosinous material being a member selected from the group consisting of natural rosins, wood rosin esters, polymeric rosinous materials, hydrogenated wood rosins, polyterpene resins, and mixtures of at least two of said members;

C. from about 0.01 to about 5.0 parts by weight per 100 parts by weight of polymer of a nucleating agent.

2. The composition according to claim 1 wherein said polyhydroxy aromatic compound is present in a concentration of from about 0.2 to about 3.0 parts by weight per 100 parts by weight of polymer, and said rosinous material is present in a concentration of from about 0.5 to about 5.0 parts by weight per 100 parts by weight of resin.

3. The composition according to claim 1 wherein said polymer is a homopolymer having incorporated therein from about 0.25 to about 20.0 parts by weight per 100 parts by weight of polymer of wood rosin; and from about 0.01 to about 5.0 parts by weight per 100 parts by weight of polymer of sodium benzoate.

* * * * *